(No Model.)
R. W. WHITEHURST.
PLOW.
No. 362,912. Patented May 10, 1887.
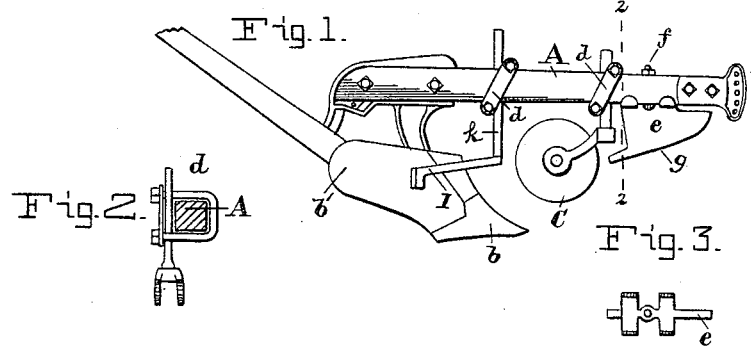
Fig. 1.
Fig. 2.
Fig. 3.
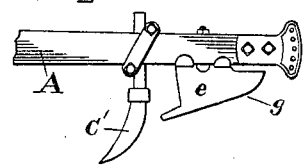
Fig. 4.
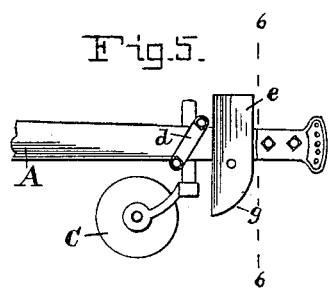
Fig. 5.
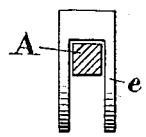
Fig. 6.
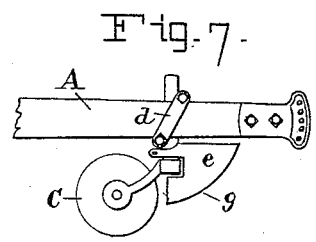
Fig. 7.
Fig. 8.
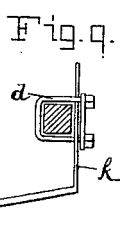
Fig. 9.
WITNESSES:
John E. Morris.
A. C. Eader.
INVENTOR:
Robt. W. Whitehurst
BY Chas B. Mann
ATTORNEY.

United States Patent Office.

ROBERT W. WHITEHURST, OF NORFOLK, VIRGINIA, ASSIGNOR OF ONE-HALF TO McDONALD L. WRENN, OF SAME PLACE.

PLOW.

SPECIFICATION forming part of Letters Patent No. 362,912, dated May 10, 1887.

Application filed February 25, 1887. Serial No. 228,802. (No model.)

*To all whom it may concern:*

Be it known that I, ROBERT W. WHITEHURST, a citizen of the United States, residing at Norfolk, in the county of Norfolk and State of Virginia, have invented certain new and useful Improvements in Plows, of which the following is a specification.

My invention relates to certain improvements in attachments for plows, which are illustrated in the accompanying drawings.

Figure 1 is a side view of a plow having my improvements attached. Fig. 2 is a cross-section of the plow-beam on the line 2 2. Fig. 3 is a top view of the weight shown in Fig. 1. Fig. 4 is a side view of a plow-beam, drag-colter, and weight. Fig. 5 is a side view of plow-beam, disk-colter, and modified form of weight. Fig. 6 is a cross-section of the plow-beam on line 6 6. Fig. 7 is a side view of a plow-beam, and a disk-colter and weight, both attached by one clip. Fig. 8 is a top view of a plow-beam, weight, and vine or grass attachment. Fig. 9 is a cross-section of the plow-beam on the line 9 9.

The letter A designates the plow-beam; b, the point, and b' the mold-board. The disk-colter C is secured to the plow-beam in front of the point b by a clip or cuff, d, of well-known form, and a weighted presser, e, is secured in any suitable manner in front of the colter, and serves to keep the latter down to the ground, and thus insures its proper performance of duty in cutting grass, weeds, or vines.

In Figs. 1, 3, and 4 the weight is shown suspended at the lower side of the beam by a bolt, f, which passes up through the beam. To facilitate the passage of the weight over grass, weeds, or vines as the plow is drawn forward, the lower side of the weight is curved or inclined downward and rearward, as at g, to an approximate sled-runner shape. By this device the grass, weeds, or vines are pressed down in front of the colter, and, as the lowest part of the inclined side of the weight is adjacent to the colter, this latter part is able to pass over and cut the said grass. In Fig. 4 the weight is shown as coacting with a drag-colter, C'.

It is to be understood that the colter herein referred to is a distinct and separate device from the rest of the plow, and is attached to the beam in front of the point. In Figs. 5 and 6 a modified form of weight is shown. Here the weight is placed upon and sets astride of the beam.

In Fig. 7 the colter and weight are attached to the beam by one and the same clip or cuff d. These plow attachments are designed for service where grass, pea-vines, or other similar vegetable growth is rank, and to do effective service the plow should be provided with some device which will depress or hold the grass or vines down at the point where the mold-board may turn the furrow over on them. To supply this want, I have devised the grass-depressing attachment, (seen in Figs. 1, 8, and 9,) consisting of the horizontal arm I, secured to the plow in front of the mold-board, and the length of said arm extending in a direction crosswise of the path of the plow. At one end this arm has a vertical shank, k, which is secured to the plow-beam A by a clip or cuff, d. It will be seen that by loosening the clip d, which holds the shank k, the grass-depressing arm I may be set higher or lower to suit the depth at which the plow is to be worked.

This attachment is particularly serviceable in high weeds or vines. It may be used to advantage with both the colter and weight, or with either one of said parts, or in certain conditions it may be used alone.

Having described my invention, I claim and desire to secure by Letters Patent of the United States—

1. A plow having the weighted presser e, with inclined under face, g, secured to the plow-beam in front of the colter, whereby the grass or weeds are pressed down so as to be readily cut by the said colter, substantially as described.

2. The combination of the plow-beam A, the colter C, and the weighted presser e, the latter secured to the beam in front of the colter and having the inclined under face, g, formed as shown, all substantially as and for the purpose set forth.

In testimony whereof I affix my signature in the presence of two witnesses.

ROBERT W. WHITEHURST.

Witnesses:
F. D. LOWELL,
GEO. D. DEY.